United States Patent [19]

Hamada et al.

[11] Patent Number: 4,756,209

[45] Date of Patent: Jul. 12, 1988

[54] DRIVE POWER TRANSMISSION DEVICE

[75] Inventors: Tetsurou Hamada; Kazunori Shibuya; Katsuhiko Masuda; Kazuhiko Shimada, all of Saitama, Japan

[73] Assignee: Honda Giken Kogyo Kabushiki Kaisha, Tokyo, Japan

[21] Appl. No.: 68,568

[22] Filed: Jun. 30, 1987

[30] Foreign Application Priority Data

Jun. 30, 1986 [JP] Japan ............................ 61-153575

[51] Int. Cl.$^4$ ........................... F16H 1/44; F16H 1/42
[52] U.S. Cl. ................................ 74/711; 74/710.5; 74/714; 180/249
[58] Field of Search ..................... 74/710.5, 711, 714; 180/248, 249

[56] References Cited

U.S. PATENT DOCUMENTS

| | | | |
|---|---|---|---|
| 4,022,084 | 5/1977 | Pagdin et al. | 74/711 |
| 4,672,861 | 6/1987 | Lanzer | 74/710.5 X |
| 4,677,875 | 7/1987 | Batchelor | 74/695 |
| 4,693,334 | 9/1987 | Hiraiwa | 180/249 |
| 4,712,448 | 12/1987 | Lanzer | 74/710.5 X |
| 4,714,129 | 12/1987 | Mueller | 74/711 X |
| 4,718,300 | 1/1988 | Magg | 74/711 X |

FOREIGN PATENT DOCUMENTS 3533142 4/1986 Fed. Rep. of Germany ...... 180/248

*Primary Examiner*—Dirk Wright
*Attorney, Agent, or Firm*—Lyon & Lyon

[57] ABSTRACT

A drive power transmission device includes an input carrier having a front portion for receiving drive power from a drive source and a tubular rear portion, a planetary gear mechanism having a sun gear disposed coaxially in the tubular portion of the input carrier, a plurality of planet gears meshing with the sun gear and rotatably supported on a periphery of the tubular portion, and a ring gear mounted concentrically on the tubular portion and meshing with the planet gears, a first output shaft coupled to and supporting the sun gear, an intermediate tubular member connectable to the first output shaft and a rear end of the tubular rear portion of the input carrier and disposed concentrically with the first output shaft, an outer tubular member connectable to the ring gear and disposed concentrically with the intermediate tubular member, a viscous shear coupling mechanism interconnecting the outer tubular member and the intermediate tubular member, and a second output shaft coupled to and supporting the outer tubular member. The viscous shear coupling mechanism comprises two groups of mutually interleaves plates disposed in a fluid chamber defined between the intermediate tubular member and the outer tubular member and filled with a fluid and fixedly fitted over the intermediate tubular member and in the outer tubular member.

6 Claims, 3 Drawing Sheets

DRIVE POWER TRANSMISSION DEVICE

BACKGROUND OF THE INVENTION

1. Field of the Invention

The present invention relates to a drive power transmission device for use in a motor vehicle, and more particularly to a drive power transmission device for use in a four-wheel drive motor vehicle.

2. Description of the Relevant Art

One known central differential for a four-wheel drive motor vehicle is a control device for an automotive transfer assembly disclosed in Japanese Utility Model Publication No. 56-55055, for example. The control device has a planetary gear mechanism essentially comprising a sun gear, plant gears, and a ring gear.

Another central differential heretofore proposed is a viscous shear coupling disclosed in U.S. Pat. No. 4,022,084. The disclosed viscous shear coupling comprises coaxial input and output shafts, an enclosure disposed between the input and output shafts, and first and second groups of plates housed in the enclosure and coupled respectively to the input and output shafts. The plates of the first and second groups are mutually interleaved or alternately arranged in the enclosure. The enclosure is filled with highly viscous silicone oil. Drive power from the input shaft can be transmitted to the output shaft by shearing forces of the silicone oil present between the first and second plates.

When steering a certain four-wheel drive motor vehicle into a garage or a parking space at low speed, difficulty has heretofore arisen in maneuvering the motor vehicle because of the difference between the angular speeds of front and rear wheels. Where a central differential is employed in a four-wheel drive motor vehicle, it can absorb the difference between the angular speeds of front and rear wheels to allow the motor vehicle to turn smoothly, for thereby eliminating the problem of tight turn braking which would otherwise be caused by direct coupling between the front and rear wheels.

For anti-skid control of the front and rear wheels of such a four-wheel drive motor vehicle when it is braked, it is preferable that the front and rear wheels be controlled independently of each other without limiting the differential movement of the front and rear wheels. When starting the motor vehicle on a slippery road such as a snow-covered road, on the other hand, the differential movement of the central differential should be limited for effective transmission of drive power. This can prevent front or rear wheels from excessively rotating idly, making the motor vehicle highly capable of running over rough terrain or the like. Moreover, while the motor vehicle is running normally, more drive power should be distributed to the front wheels than to the rear wheels for greater stability of the motor vehicle since lateral forces applied to the tires start being reduced earlier for the front wheeels than for the rear wheels, thus allowing the driver to predict a reduction in the lateral forces on the rear wheels.

However, the conventional central differentials have failed to meet the above different requirements or functions.

SUMMARY OF THE INVENTION

The present invention has been made in view of the aforesaid problems of the conventional central differentials.

It is an object of the present invention to provide a drive power transmission device capable of appropriately distributing drive power from a drive source to front and rear wheels of a four-wheel drive motor vehicle dependent on the running condition of the motor vehicle.

According to the present invention, there is provided a drive power transmission device includes an input carrier having a front portion for receiving drive power from a drive source and a tubular rear portion, a planetary gear mechanism having a sun gear disposed coaxially in the tubular portion of the input carrier, a plurality of planet gears meshing with the sun gear and rotatably supported on a periphery of the tubular portion, and a ring gear mounted concentrically on the tubular portion and meshing with the planet gears, a first output shaft coupled to and supporting the sun gear, an intermediate tubular member connectable to the first output shaft and a rear end of the tubular rear portion of the input carrier and disposed concentrically with the first output shaft, an outer tubular member connectable to the ring gear and disposed concentrically with the intermediate tubular member, a viscous shear coupling mechanism interconnecting the outer tubular member and the intermediate tubular member, and a second output shaft coupled to and supporting the outer tubular member.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

Figure 1:
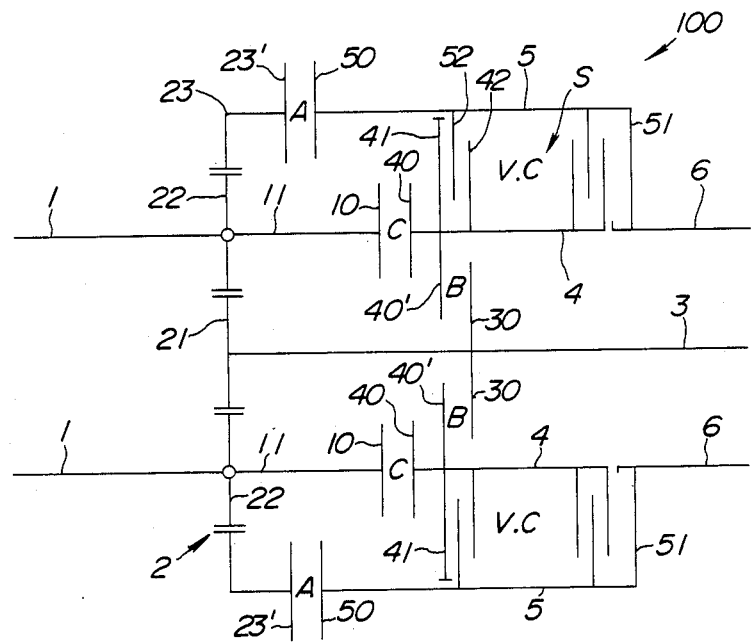
FIG. 1 is a schematic view of a drive power transmission device according to an embodiment of the present invention.

FIG. 1 illustrates a drive power transmission device according to an embodiment of the present invention which can be incorporated in a four-wheel drive motor vehicle.

The drive power transmission device, generally designated by the reference numeral 100, essentially comprises an input shaft or carrier 1 coupled to a drive source or engine (not shown), a planetary differential mechanism 2 coupled to the input carrier 1, a first output shaft 3 coupled to the planetary differential mechanism 2, an outer tubular member 5 disposed concentrically with the first output shaft 3 and connectable to the planetary differential mechanism 2, an intermediate tubular member 4 disposed concentrically between the first output shaft 3 and the outer tubular member 5 and coupled to the outer tubular member 5 through a viscous shear coupling mechanism VC therebetween and connectable to the input carrier 1, a second output shaft 6 coupled to the outer tubular member 5, and three clutches A, B, C.

More specifically, as shown in FIG. 1, the input carrier 1 has a front portion (not shown) coupled to the drive source and a rear tubular portion opening rearwardly and having a rear end area connected to the planetary differential mechanism 2 so that drive power from the drive source will be transmitted to the planetary differential mechanism 2. The planetary differential mechanism 2 has a sun gear 21 disposed in the tubular portion of the input carrier 1, a plurality of planet gears 22 meshing with the sun gear 21 and rotatably supported on the periphery of the rear end area of the tubular portion of the input carrier 1, and a ring gear 23 meshing with the planet gears 22 and disposed concentrically on the periphery of the rear end area of the tubular portion of the input carrier 1. The sun gear 21 is coupled to and supported on the front end of the first output shaft 3 which is opposite to the input carrier 1 across the planetary differential mechanism 2 and extends coaxially with the input carrier 1. The main portion of the input carrier 1, except the rear end portion 11 of the tubular portion thereof, and the first output shaft 3 extend in opposite directions from the planetary differential mechanism 2 disposed centrally therebetween.

The rear end portion 11 is of a tubular shape which is substantially identical to the tubular portion of the input carrier 1. The rear end portion 11 is positioned in confronting relation to the front end of the intermediate tubular member 4 extending concentrically with the first output shaft 3. The rear end of the tubular portion of the input carrier 1 and the front end of the intermediate tubular member 4 can be connected to and disconnected from each other by the third clutch C which has a flange-shaped clutch plate 10 on the periphery of the rear end of the tubular portion of the input carrier 1 and a flange-shaped clutch plate 40 disposed on the periphery of the front end of the intermediate tubular member 4 in axially confronting relation to the clutch plate 10. Thus, the input carrier 1 and the intermediate tubular member 4 are selectively connectable to each other.

The intermediate tubular member 4 is also connectable to the first output shaft 3 by the second clutch B comprising a clutch plate 40' disposed on the inner periphery of the intermediate tubular member 4 and a clutch plate 30 disposed on the first output shaft 3 in axially confronting relation to the clutch plate 40'.

The outer tubular member 5 is disposed concentrically around the intermediate tubular member 4 and has a front end facing the ring gear 23 of the planetary differential mechanism 2. The outer tubular member 5 and the ring gear 23 are connectable to each other by the first clutch A which comprises a flange-shaped clutch plate 50 disposed on the periphery of the front end of the outer tubular member 5 and a flange-shaped clutch plate 23' on the ring gear 23.

The outer tubular member 5 is always held in engagement with the intermediate tubular member 4 by the viscous shear coupling mechanism VC disposed therebetween. The viscous shear coupling mechanism VC is positioned in a fluid chamber S defined by an annular side wall 41 fitted over the intermediate tubular member 4 behind the clutch plate 40 and slidably fitted in the outer tubular member 5, an annular flange member 51 fixed to the inner periphery of the rear end of the outer tubular member 5 and extending radially inwardly in slidably fitting relation to the outer periphery of the rear end of the intermediate tubular member 4, an outer peripheral surface of the intermediate tubular member 4 between the annular side wall 41 and the annular flange member 51, and an inner peripheral surface of the outer tubular member 5. The viscous shear coupling mechanism VC includes a first group of axially spaced plates or disks 42 fitted over and splined to the intermediate tubular member 4 and a second group of axially spaced plates or disks 52 fitted in and splined to the outer tubular member 5, the plates 42, 52 being alternately arranged, i.e., mutually interleaved. The fluid chamber S is filled with a highly viscous fluid such as silicone oil.

The second output shaft 6 is in the form of a tubular member extending rearwardly from the inner periphery of the annular flange member 51 in concentric relation thereto. The first output shaft 1 extends concentrically through the second output shaft 6.

Figure 6:
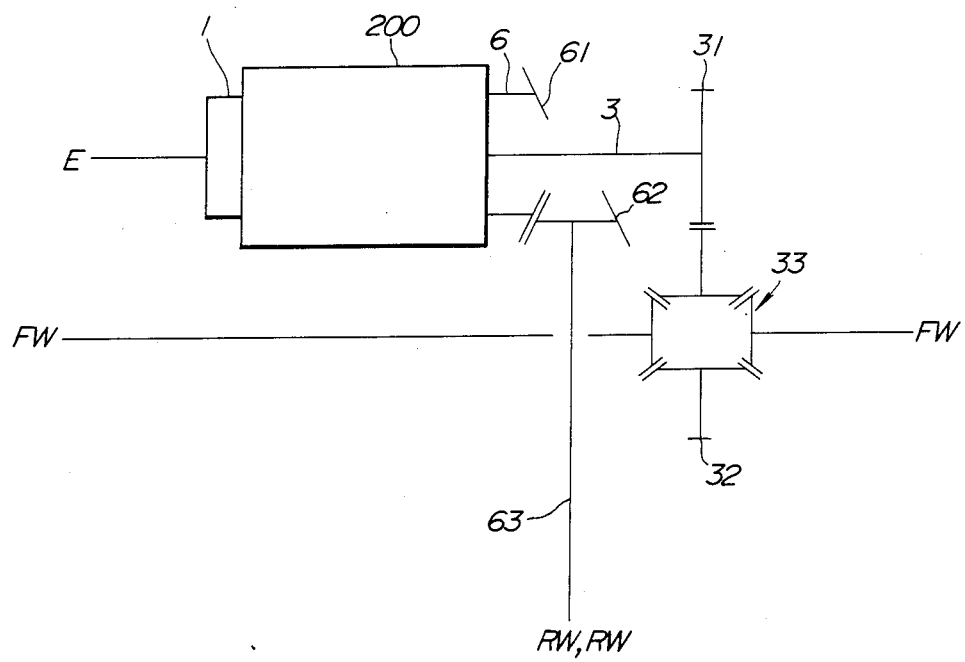
FIG. 6 is a schematic view of a drive system wherein the drive power transmission device of the invention is incorporated in a four-wheel drive motor vehicle.

The drive power transmission device 100 is housed in a gear case 200 as shown in FIG. 6. Output drive power from an engine E is applied to the front end of the input carrier 1 projecting from the gear case 200. The rear end of the first output shaft 3 projects from the gear case 200 and is coupled to a front differential 33 through gears 31, 32 for transmitting the drive power through the front differential 33 to a pair of front wheels FW. The tubular end of the second output shaft 6 projecting from the gear case 200 is coupled to a propeller shaft 63 through bevel geras 61, 62 for transmitting the drive power through a rear differential (not shown) to a pair of rear wheels RW.

The three clutches A, B, C are engaged and disengaged according to four conditions (given in the table below) in the drive power transmission system in a four-wheel drive motor vehicle which is equipped with the drive power transmission device 100.

TABLE

| | Clutches | | |
| Conditions | A | B | C |
| --- | --- | --- | --- |
| I | Engaged | Disengaged | Disengaged |
| II | Engaged | Engaged | Disengaged |
| III | Disengaged | Engaged | Engaged |
| IV | Engaged | Engaged | Engaged |

Figure 2:
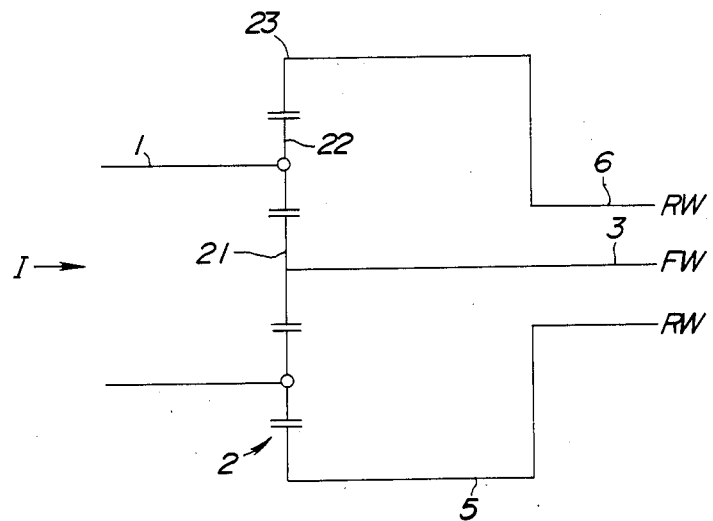
FIG. 2 is a schematic view showing a power transmission path of the drive power transmission device when a first clutch is connected.

Under the first condition I, the first clutch A is engaged and the second and third clutches B, C are disengaged. The drive power transmission path established in this condition is shown in FIG. 2. Since the ring gear 23 and the outer tubular member 5 are directly connected to each other, drive power I from the drive source or engine is transmitted via the planetary gear mechanism 2 to the first and second output shafts 3, 6. Therefore, the drive torque is transmitted to the front wheels FW and the rear wheels RW at a ratio determined by the planetary differential mechanism 2.

Thus, any difference between the angular speeds of the front and rear wheels, which may be produced during a tight turn, for example, can be eliminated by the planetary differential mechanism 2, allowing the motor vehicle to make a smooth turn. In addition, the front and rear wheels can independently be controlled when anti-skid or anti-lock control is made of the front and rear wheels upon braking.

Figure 3:
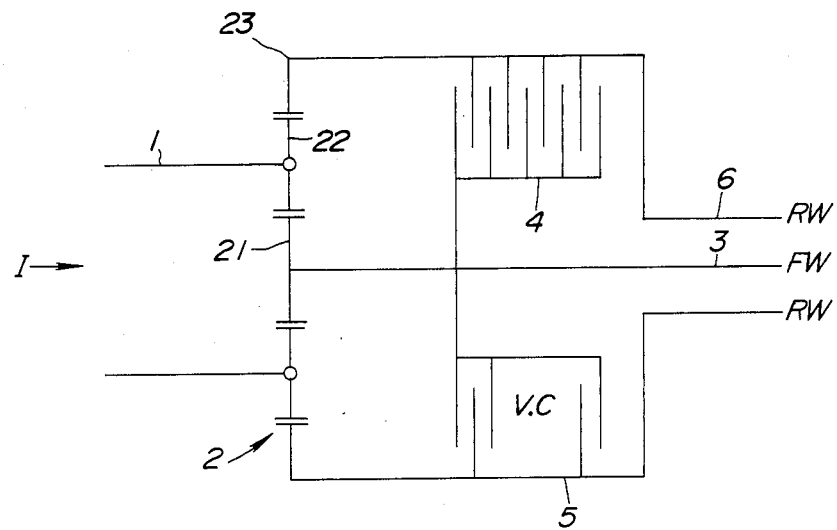
FIG. 3 is a schematic view showing a power transmission path of the drive power transmission device when the first clutch and a second clutch are connected.

Under the second condition II, the first and second clutches A, B are engaged and the third clutch C is disengaged. FIG. 3 shows the drive power transmission path established in the second condition II. The ring gear 23 and the outer tubular member 5 are directly interconnected, and the intermediate tubular member 4 and the first output shaft 3 are also directly interconnected. Therefore, the viscous shear coupling mechanism VC between the outer tubular member 5 and the intermediate tubular member 4 is brought into operation.

The drive power I from the drive source is transmitted to the front and rear wheels FW, RW at a torque ratio determined by the planetary differential mechanism 2, as in the condition I. If the difference between the angular speeds of the first and second output shafts 3, 6, i.e., the front and rear wheels, tends to become excessively large, then the viscous shear coupling mechanism VC limits the differential movement between the first and second output shafts 3, 6. The viscous shear coupling mechanism VC thus serves as a limited-slip central differential. When the four-wheel drive motor vehicle starts on a slippery road such as a snow-covered road, the limited-slip viscous shear coupling mechanism VC can effectively transmit the drive power to the front and rear wheels so that the front or rear wheels are prevented from excessively rotating idly. The motor vehicle is highly capable of running over rough terrain.

Figure 4:
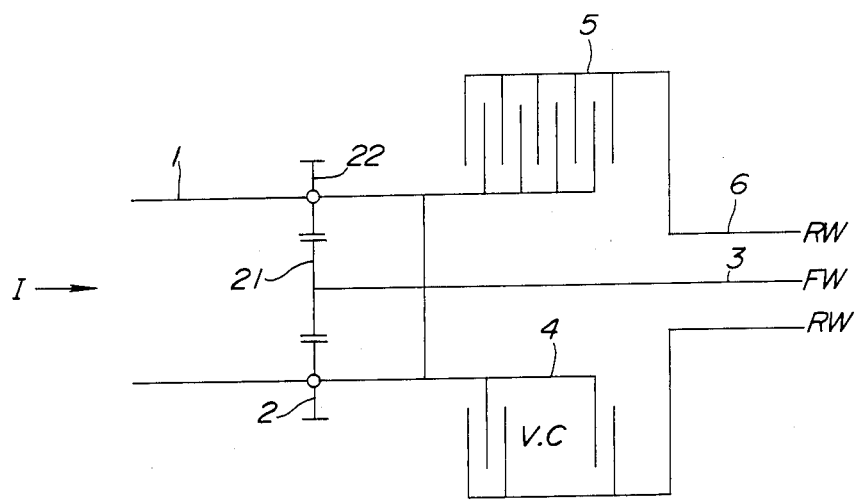
FIG. 4 is a schematic view showing a power transmission path of the drive power transmission device when the second clutch and a third clutch are connected.

Under the third condition III, the first clutch A is disengaged and the second and third clutches B, C are engaged. The drive power is now transmitted through a path as shown in FIG. 4. The ring gear 23 is disconnected from the outer tubular member 5, whereas the input carrier 1 and the first output shaft 3 are directly connected to each other and also to the intermediate tubular member 4. The viscous shear coupling mechanism VC between the outer tubular member 5 and the intermediate tubular member 4 now operates, but the planetary differential mechanism 2 does not operate.

The drive power I from the drive source is transmitted to the first output shaft 3 for directly transmitting drive torque to the front wheels FW. The drive torque is transmitted to the second output shaft 6 and hence the rear wheels RW through the viscous shear coupling mechanism VC at a ratio commensurate with the differential rotation between the front and rear wheels FW, RW due to idling rotation of the front wheels FW.

While the motor vehicle is running normally, the drive power applied to the front wheels is greater than the drive power applied to the rear wheels. Since lateral forces applied to the tires start being reduced earlier for the front wheels than for the rear wheels, the driver can predict a reduction in the lateral forces on the rear wheels. Therefore, the motor vehicle has greater stability.

Figure 5:
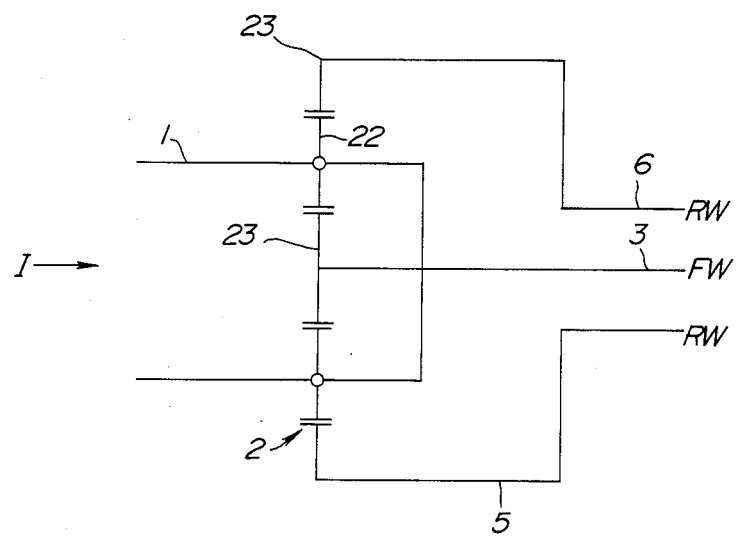
FIG. 5 is a schematic view showing a power transmission path of the drive power transmission device when all of the first, second, and third clutches are connected.

Under the fourth condition IV, all of the first, second, and third clutches A, B, C are engaged. The drive power transmission path at this time is illustrated in FIG. 5. The first and second output shafts 3, 6 are directly coupled to the input carrier 1. Therefore, the drive power I from the drive source is directly transmitted to the front and rear wheels FW, RW. Inasmuch as the central differential is locked, the efficiency of driving the front and rear wheels is increased.

With the present invention, as described above, one of the different paths for transmitting drive power from the drive source to the front and rear wheels in the four-wheel drive motor vehicle is selected according to the running condition of the motor vehicle, so that the drive power can be distributed to the front and rear wheels at a ratio dependent on the running condition for thereby enabling the four-wheel drive motor vehicle to be maneuvered well in various manners. For example, the motor vehicle can be turned without undergoing the problem of tight turn braking, and the front and rear wheels can independently controlled for anti-lock braking. The front or rear wheels are prevented from excessively rotating idly thus making the motor vehicle highly capable of running over rough terrain, and more drive power can be distributed to the front wheels than to the rear wheels.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

We claim:
1. A drive power transmission device comprising:
an input carrier having a front portion for receiving drive power from a drive source and a tubular rear portion;
a planetary gear mechanism having a sun gear disposed coaxially in said tubular portion of said input carrier, a plurality of planet gears meshing with said sun gear and rotatably supported on a periphery of said tubular portion, and a ring gear mounted concentrically on said tubular portion and meshing with said planet gears;
a first output shaft coupled to and supporting said sun gear;
an intermediate tubular member connectable to said first output shaft and a rear end of said tubular rear portion of said input carrier and disposed concentrically with said first output shaft;
an outer tubular member connectable to said ring gear and disposed concentrically with said intermediate tubular member;
a viscous shear coupling mechanism interconnecting said outer tubular member and said intermediate tubular member; and
a second output shaft coupled to and supporting said outer tubular member.

2. A drive power transmission device according to claim 1, further including first clutch means, said ring gear and said outer tubular member being operatively coupled to each other by said first clutch means.

3. A drive power transmission device according to claim 2, further including second clutch means, said first output shaft and said intermediate tubular member being operatively coupled to each other by said second clutch means.

4. A drive power transmission device according to claim 1, further including second and third clutch means, said first output shaft and said intermediate tubular member being operatively coupled to each other by said second clutch means, and said rear end of the tubular rear portion of said input carrier and said intermediate tubular member being operatively coupled to each other by said third clutch means.

5. A drive power transmission device according to claim 4, further including first clutch means, said ring gear and said outer tubular member being operatively coupled to each other by said first clutch means.

6. A drive power transmission device according to claim 1, wherein said viscous shear coupling mechanism comprises a fluid chamber defined between said outer tubular member and said intermediate tubular member, a number of first axially spaced annular disks disposed in said fluid chamber and fixedly fitted over said intermediate tubular member, a number of second axially spaced annular disks disposed in said fluid chamber and fixedly fitted in said outer tubular member, said first and second annular disks being mutually interleaved, and a highly viscous fluid filled in said fluid chamber.

* * * * *